2,861,056

RESINOUS CARBOXY ESTER-LACTONES AND PROCESS FOR PREPARING THEM

Louis M. Minsk, Rochester, N. Y., assignor to Eastman Kodak Company, Rochester, N. Y., a corporation of New Jersey No Drawing. Application November 12, 1953
Serial No. 391,735

12 Claims. (Cl. 260—78.3)

This invention relates to resinous carboxy ester-lactone polymers and to a process for preparing the same. More particularly the invention relates to resinous ester-lactones prepared from interpolymers of unsaturated $\alpha,\beta$-dicarboxylic acids or their anhydrides and vinyl organic acid esters.

The interpolymers ordinarily prepared by polymerizing a mixture of an unsaturated $\alpha,\beta$-dicarboxylic acid anhydride with a vinyl organic acid ester are well known. Thus, polymerization of a mixture of maleic anhydride and vinyl acetate yields an interpolymer I which can be represented graphically as follows:

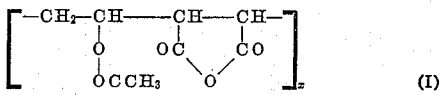
(I)

This interpolymer is brittle and insoluble in water but soluble in certain organic solvents such as acetone and pyridine. It can be saponified to give water soluble products or it can be hydrated with water to give a polymeric material II as follows:

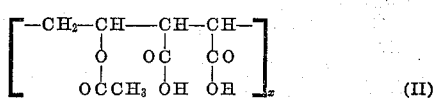
(II)

This hydrate II is in effect an interpolymer of vinyl acetate and maleic acid and is water soluble.

The interpolymers of this type have been modified by reacting them with a monohydric alcohol whereby the compound was de-acylated and esterified with the monohydric alcohol and simultaneously converted into a lactone. The resulting lactone esters are water insoluble, water intolerant and alkali insoluble, and find utility in applications where hydrophobic characteristics as well as film forming properties are necessary. Such resinous ester-lactones and their preparation are described in McNally et al., U. S. Patent 2,306,071.

For some applications, however, such as for developer-removable backings or stripping layers for photographic film, it is desirable to have highly flexible materials which are water insoluble but which will dissolve in aqueous solutions of bases. In particular these materials should be soluble in bases as weak as sodium bicarbonate.

It is accordingly an object of this invention to provide a new class of modified polymers which are flexible film-forming materials soluble in weak basic solutions.

It is another object of this invention to provide an improved method for modifying the physical and chemical characteristics of interpolymers of unsaturated $\alpha,\beta$-dicarboxylic acids or their anhydrides and vinyl organic acid esters.

It is also an object of this invention to prepare new and improved film-forming materials which are suitable for use as developer-removable backings or stripping layers or the like in photographic film.

Another object of the invention is to provide heteropolymers which have been modified by reaction with a monohydric hydroxy acid.

Another object of the invention is to provide an effective method of forming a new class of carboxy ester-lactone resins from vinyl acetate-maleic anhydride interpolymers.

Another object of the invention is to provide alkali-soluble, flexible carboxy ester-lactone polymers by the reaction of monohydric hydroxy acid of the lactic acid series with an interpolymer of vinyl acetate and maleic anhydride.

Other objects will be apparent from the description and claims which follow.

These and other objects are attained in accordance with this invention which in general comprises heating to reacting temperature under acid conditions a heteropolymer of a vinyl organic acid ester and an unsaturated $\alpha,\beta$-dicarboxylic acid with a monohydric hydroxy acid to form a carboxy ester-lactone resin. These new resins appear to have the structure

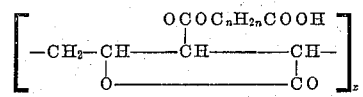

and thus can be defined as resinous carboxy esters of a monohydric hydroxy acid and a lactone of an interpolymer of vinyl alcohol and an unsaturated $\alpha,\beta$-dicarboxylic acid. In usual practice, the interpolymer is prepared using the anhydride of such acid rather than the free dicarboxylic acid itself. In the specification and claims, it will be understood that references to the unsaturated $\alpha,\beta$-dicarboxylic acid are intended to include the corresponding anhydride, that the vinyl alcohol is not usually employed as such but the interpolymer is prepared from a vinyl organic acid ester and such is intended to be within the scope of the invention as described herein and defined in the appended claims.

When the interpolymers, such as I and II above, are reacted with an aliphatic monohydric hydroxy acid of the formula $$C_nH_{2n}(OH)(COOH)_x$$

wherein $n$ is usually a whole integer of from 1 to 5 and $x$ is 1 or 2 in accordance with this invention, the heteropolymer is deacylated and then esterified with the hydroxy acid to form a carboxy ester and the acid or anhydride groups simultaneously undergo an inner condensation into a lactone grouping. The resulting carboxy ester-lactones are highly flexible, water-insoluble, and alkali soluble materials.

The new resins embodying this invention can be used to make flexible films or sheets, which, by virtue of their alkali-solubility, find application as film backing colloids, stripping layers or readily removable protective coatings for photographic or other materials. Since these materials are flexible, it is ordinarily not necessary to incorporate plasticizers into them, although plasticizing materials can be added as desired to modify the properties of these new resins still further. The resins embodying this invention can also be compounded by the addition of fillers, coloring materials such as pigments or dyes, and the like in accordance with well known practices.

The new resins can be dissolved in well-known organic solvents and films or sheets are formed by casting the solution on a film-forming surface, such as a glass or metal plate or a smooth revolving drum, allowing it to dry in a film, and then stripping it from the surface. The drying may be facilitated by blowing warm air over the film or sheet and the stripped film or sheet can be cured by treating it with warm air. The resulting sheet material is clear and transparent. The resins can be coated onto a suitable support for use as a backing layer for photographic film or can be used as an interlayer between emulsion layers for stripping. In some cases they can actually act as a carrier for photo-sensitive materials such as silver halides or they can be used as support for light-sensitive photographic coatings. The film or sheet can be coated directly with photographic emulsions or can be coated first with resinous or other materials before application of the photographic emulsion.

The interpolymers employed as starting materials are those prepared from an unsaturated $\alpha,\beta$-dicarboxylic acid or its anhydride, such as maleic acid or its anhydride, fumaric acid, itaconic acid or its anhydride, or similar well-known dicarboxylic acid and a vinyl organic acid ester such as vinyl acetate, vinyl propionate, vinyl benzoate or the like. Such interpolymers are then converted to a carboxy ester-lactone by heating at reaction temperature with a monohydric hydroxy acid which is preferably an acid of the lactic acid series. Thus, suitable hydroxy acids include glycolic acid, lactic acid, hydroxy butyric acid, hydroxy valeric acid, and hydroxy caproic acid. Other monohydric hydroxy acids such as malic acid can be employed, and such acids are well known in the art. In the treatment of the interpolymer with the monobasic hydroxy acid, the acyl groups are removed. The carboxylic acid or anhydride groups are esterified with the hydroxy acid to give carboxy ester groups and an inner condensation takes place to give a lactone. The reaction embodying this invention is carried out in the presence of a strong acid such as a mineral acid catalyst having an acidity of the order of sulfuric acid. Thus, the acid can be either sulfuric acid or hydrochloric acid.

The reaction can be effected in a solvent medium using any of the well known organic solvents which do not have a reacting group. Alternately, the reaction can be effected in a partially aqueous medium and this is particularly desirable although not necessary when treating an anhydride interpolymer. The reaction temperature is not critical although elevated temperatures of the order of 60 to 100° C. are usually employed. Higher temperatures, of course, can be used if desired but are usually not necessary. In effecting the reaction, the hydroxy acid is desirably employed in at least 2 molar proportions for each molar proportion of the interpolymer. In some cases, it may be desirable to employ the hydroxy acid in large excess and amounts of as much as 10 or even 25 molar proportions of the hydroxy acid or more can be used for each molar proportion of interpolymer.

The resinous carboxy ester lactones thus obtained are water insoluble, but dissolve in alkaline solutions as weak as solutions of sodium bicarbonate.

These materials are very flexible due to their lactone content, unlike the water-insoluble, alkali soluble carboxy polymers sometimes employed which contain no lactone grouping. The products can be modified still further by being mixed with ester-lactones prepared by reacting an interpolymer as described with a monohydric alcohol, or a monohydric alcohol can be incorporated into the reaction mixture whereby mixed ester-lactones are obtained. In the production of these new resins, the process can be carried out either batchwise or in continuous fashion in accordance with well known chemical practice.

The invention is illustrated by the following detailed examples of preferred embodiments thereof which are not intended to limit the scope of the invention unless otherwise specifically indicated.

*Example 1*

The preparation of interpolymers of vinyl organic acid esters and unsaturated $\alpha,\beta$-dicarboxylic acids are well known in the art. A typical polymerization is illustrated in the preparation of a vinyl acetate-maleic anhydride interpolymer. Thus 500 g. of maleic anhydride and 500 cc. of vinyl acetate were mixed together and warmed at 60° C. until the anhydride had dissolved. Thereafter, 0.35 g. of benzoyl peroxide was added to the solution and the temperature was gradually raised to 80° C. over a period of about 2 hours. After the vigorous reaction had subsided, the reaction mixture was heated at 80° C. for an additional few minutes and then cooled and diluted with 3 liters of acetone. The interpolymer was precipitated out by pouring the acetone solution into cool water and the resulting white interpolymer was squeezed and dried in air. Other well known interpolymers of vinyl organic acid esters and unsaturated $\alpha,\beta$-dicarboxylic acids can be prepared in a similar manner in accordance with well known practice and are suitable for use in practicing this invention.

*Example 2*

A reaction mixture of 2480 ml. dry benzene, 220.5 g. maleic anhydride, 193.5 g. distilled vinyl acetate, and 4.25 g. benzoyl peroxide was heated at reflux for 2½ hours in an all glass outfit protected from moisture by a calcium chloride tube. The thick slurry obtained was cooled, diluted with an equal volume of dry benzene. The polymer was filtered on a Buchner funnel and washed on the funnel with dry benzene. It was dried in a vacuum desiccator under a constantly applied water pump vacuum, followed by several hours in a 110° C. oven in an open dish. The yield was 343 g. The inherent viscosity in acetone in a concentration of 0.25 g. per 100 cc. was 0.47.

A 100 g. portion of this vinyl acetate-maleic anhydride interpolymer was mixed with 600 cc. of 1,4-dioxane and 400 cc. of 85% lactic acid in an all-glass reflux apparatus. The resulting mixture was then stirred while 35 cc. of concentrated sulfuric acid was added and the reaction mixture was then heated on a steam bath for 19 hours. The viscous solution thus obtained was diluted with 2 liters of acetone and then poured in a fine stream into distilled water. The fibrous product was washed free of acid with distilled water, during which time it hardened. It was then dried under vacuum over calcium chloride and the dried product weighed 77 g. A 2 g. portion of this carboxy ester-lactone was dispersed in 20 cc. of a mixture of 9 parts of acetone and 1 part of water. To the mixture was added 5 cc. of $\beta$-methoxy ethyl alcohol and a film was cast on a glass plate. After being cured in warm air, the film was clear and flexible and was soluble in aqueous sodium bicarbonate or sodium hydroxide but insoluble in water. This film made an excellent backing for photographic film and dissolved away readily in slightly basic developer solutions.

*Example 3*

A mixture of 20 g. of vinyl acetate-maleic anhydride interpolymer, 120 cc. of 1,4-dioxane, 50 g. of crystalline glycolic acid, 10 cc. of distilled water and 7 cc. of concentrated sulfuric acid was heated on the steam bath for 21 hours. The reaction mixture was then diluted with acetone and the product was precipitated into water. After being dried, the product was a white fibrous material weighing 16.5 g. and this product was cast into a clear flexible film as described in the preceding example. As in the case of the lactic acid modified product, this product was water insoluble but soluble in weak solutions of alkaline material.

As can be seen from the examples, the reaction embodying the invention proceeds readily in both aqueous and nonaqueous solutions. When water is employed, about 1 molecular proportion of water is desirably used for each molecular proportion of anhydride although larger or smaller amounts can be used if desired. Similar modified resins are obtained with other well known monohydric hydroxy acids and with these and other interpolymers as described. In some cases it may be desirable to react the interpolymer with a hydroxylated material which has another hydrophilic group such as an amide or sulfonic acid group.

The resins prepared by means of this invention can, of course, be modified by admixture with varying amounts of such modifying agents as non-drying oils, drying oils, semidrying oils, natural or synthetic resins, waxes or other polymeric materials such as cellulose derivatives. The carboxy ester-lactone resins advantageously contain an acyl group content equivalent to not more than about 10% by weight of vinyl ester and preferably not more than about 5%. In some cases it may be desirable to treat the interpolymer with two or more of the hydroxy acids simultaneously in order to obtain mixed carboxy ester-lactones and such mixtures are considered to be within the scope of this invention.

Although the invention has been described in considerable detail with reference to certain preferred embodiments thereof variations and modifications can be effected without departing from the spirit and scope of the invention as described hereinabove and as defined in the appended claims.

I claim:

1. A carboxy ester of a monohydroxy carboxylic acid of the formula $C_nH_{2n}(OH)(COOH)_x$ wherein $n$ is an integer in the range of 1–5 inclusive and $x$ is an integer in the range of 1–2 inclusive and a lactone of an interpolymer of vinyl alcohol and an unsaturated $\alpha,\beta$-dicarboxylic acid compound from the group consisting of maleic acid, fumaric acid, itaconic acid, and their anhydrides, the carboxy group of the carboxy ester being the carboxy group of said monohydroxy carboxylic acid, said carboxy ester being obtained according to the process of claim 5.

2. A carboxy ester of an aliphatic monohydric hydroxy acid of the formula $C_nH_{2n}(OH)(COOH)_x$ wherein $n$ is an integer in the range of 1–5 inclusive and $x$ is an integer in the range of 1–2 inclusive and a lactone of an interpolymer of vinyl alcohol and maleic acid, the carboxy group of said carboxy ester being the carboxy group of said monohydric hydroxy acid, said carboxy ester being obtained according to the process of claim 5.

3. A carboxy ester of a monobasic monohydroxy acid of the lactic acid series containing from 2 to 6 carbon atoms and a lactone of an interpolymer of vinyl alcohol and an unsaturated $\alpha,\beta$-dicarboxylic acid compound from the group consisting of maleic acid, fumaric acid, itaconic acid, and their anhydrides, the carboxy group of the carboxy ester being the carboxy group of said monobasic monohydroxy acid, said carboxy ester being obtained according to the process of claim 5.

4. A carboxy ester of a monobasic monohydroxy acid of the lactic acid series containing from 2 to 6 carbon atoms and a lactone of an interpolymer of vinyl alcohol and maleic acid, the carboxy group of said carboxy ester being the carboxy group of said monobasic monohydroxy acid, said carboxy ester being obtained according to the process of claim 5.

5. The method of preparing a flexible modified polymer which comprises heating to at least 60° C., in the presence of a mineral acid, 1 molar proportion of an interpolymer of a vinyl organic acid ester and an unsaturated $\alpha,\beta$-dicarboxylic acid compound from the group consisting of maleic acid, fumaric acid, itaconic acid, and their anhydrides, the carboxy group of the carboxy ester being the carboxy group of said monohydric hydroxy acid, with at least 2 molar proportions of a monohydric hydroxy acid of the formula $C_nH_{2n}(OH)(COOH)_x$ wherein $n$ is an integer in the range of 1–5 inclusive and $x$ is an integer in the range of 1–2 inclusive, and thereby forming a carboxy ester-lactone resin.

6. The method of preparing a flexible resinous ester which comprises heating to at least 60° C., in the presence of a mineral acid, 1 molar proportion of a vinyl acetate-maleic anhydride interpolymer with at least 2 molar proportions of lactic acid.

7. The method of preparing a flexible resinous ester which comprises heating to at least 60° C., in the presence of a mineral acid, 1 molar proportion of a vinyl acetate-maleic anhydride interpolymer with at least 2 molar proportions of glycolic acid.

8. The method of preparing a flexible resinous ester which comprises heating to at least 60° C., in the presence of sulfuric acid, 1 molar proportion of an interpolymer of a vinyl organic acid ester and an unsaturated $\alpha,\beta$-dicarboxylic acid, with at least 2 molar proportions of an aliphatic monohydroxy carboxylic acid of the formula $C_nH_{2n}(OH)(COOH)_x$ wherein $n$ is an integer in the range of 1–5 inclusive and $x$ is an integer in the range of 1–2 inclusive and thereby forming a carboxy ester-lactone resin.

9. The method which comprises heating to at least 60° C., in the presence of sulfuric acid as a catalyst, 1 molar proportion of an interpolymer of vinyl acetate and maleic anhydride with at least 2 molar proportions of lactic acid and thereby forming a flexible water-insoluble alkli-soluble carboxy ester-lactone resin.

10. The method which comprises heating to at least 60° C., in the presence of sulfuric acid as a catalyst, 1 molar proportion of an interpolymer of vinyl acetate and maleic anhydride with at least 2 molar proportions of glycolic acid and thereby forming a flexible water-insoluble alkali-soluble carboxy ester-lactone resin.

11. The product obtained according to the method of claim 6.

12. The product obtained according to the method of claim 7.

References Cited in the file of this patent

UNITED STATES PATENTS

| | | |
|---|---|---|
| 2,188,272 | Voss et al. | Jan. 23, 1940 |
| 2,306,071 | McNally et al. | Dec. 22, 1942 |